(12) United States Patent
Chopra et al.

(10) Patent No.: US 9,052,952 B1
(45) Date of Patent: Jun. 9, 2015

(54) ADAPTIVE BACKUP MODEL FOR OPTIMIZING BACKUP PERFORMANCE

(75) Inventors: Shelesh Chopra, Karnataka (IN); Rajendra Kumar Gupta, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 280 days.

(21) Appl. No.: 13/618,039

(22) Filed: Sep. 14, 2012

(51) Int. Cl.
*G06F 9/46* (2006.01)
*G06F 15/173* (2006.01)
*G06F 9/50* (2006.01)

(52) U.S. Cl.
CPC ............... *G06F 9/50* (2013.01); *G06F 9/5027* (2013.01); *G06F 9/5005* (2013.01); *G06F 9/5011* (2013.01); *G06F 9/5033* (2013.01); *G06F 9/5016* (2013.01); *G06F 9/5083* (2013.01); *G06F 9/5044* (2013.01); *G06F 9/5088* (2013.01); *G06F 9/505* (2013.01); *G06F 9/5055* (2013.01)

(58) Field of Classification Search
CPC ....... G06F 9/50; G06F 9/5005; G06F 9/5027; G06F 9/505; G06F 9/5055; G06F 9/5083
See application file for complete search history.

(56) References Cited

U.S. PATENT DOCUMENTS

| 6,341,303 | B1 | | 1/2002 | Rhee et al. | |
|---|---|---|---|---|---|
| 7,058,947 | B1 | * | 6/2006 | Raja et al. | 718/104 |
| 7,305,379 | B2 | * | 12/2007 | Goyal et al. | 1/1 |
| 7,752,624 | B2 | | 7/2010 | Crawford et al. | |
| 8,386,607 | B2 | | 2/2013 | Hu et al. | |
| 2004/0181794 | A1 | * | 9/2004 | Coleman et al. | 718/104 |
| 2006/0064691 | A1 | * | 3/2006 | Blaisdell et al. | 718/100 |
| 2007/0240162 | A1 | * | 10/2007 | Coleman et al. | 718/104 |
| 2008/0282253 | A1 | * | 11/2008 | Huizenga | 718/104 |
| 2009/0172670 | A1 | * | 7/2009 | Bobak et al. | 718/100 |
| 2009/0172688 | A1 | * | 7/2009 | Bobak et al. | 718/104 |
| 2010/0251258 | A1 | * | 9/2010 | Hanamori et al. | 718/105 |
| 2012/0221521 | A1 | * | 8/2012 | Chiu et al. | 707/622 |
| 2012/0227049 | A1 | | 9/2012 | Longobardi et al. | |
| 2012/0297067 | A1 | * | 11/2012 | Arrowood et al. | 709/226 |
| 2013/0007753 | A1 | * | 1/2013 | Jain | 718/103 |

OTHER PUBLICATIONS

Holze et al, "Towards Workload-Aware Self-Management: Predicting Significant Workload Shifts", 2010, IEEE, pp. 111-116.*
Solomon et al, "A Real-Time Adaptive Control of Autonomic Computing Environments", IBM, 2007, pp. 1-13.*
Bahati et al, "Policy-driven Autonomic Management of Multi-component Systems", University of Western Ontario, 2007, pp. 1-15.*

* cited by examiner

*Primary Examiner* — Charles Swift
(74) *Attorney, Agent, or Firm* — Staniford Tomita LLP

(57) ABSTRACT

This disclosure relates to a method, article of manufacture, and apparatus of adaptive storage system management for optimizing performance. In some embodiments, this includes polling attributes associated with a workload of a storage system to obtain corresponding values at a time instance, analyzing the values and the attributes to determine a need for modifying a set of the values corresponding to a set of the attributes when the workload is not at an optimized level, modifying the set of the values in response to the determination, and storing the time instance, the attributes, the values, and the modification.

15 Claims, 5 Drawing Sheets

| TIME | ATTRIBUTE | VALUE |
|------|-----------|-------|
| t1 | Server CPU | 65% |
| t1 | Client CPU | 75% |
| t1 | Throughput | 80 |
| ... | ... | ... |
| t2 | Server CPU | 90% |
| ... | ... | ... |

ADAPTIVE BACKUP MODEL FOR OPTIMIZING BACKUP PERFORMANCE

CROSS-REFERENCE TO RELATED APPLICATION

This application is related to co-pending U.S. patent application Ser. No. 13/618,209 for ADAPTIVE POLICY GENERATING METHOD AND SYSTEM FOR PERFORMANCE OPTIMIZATION and filed concurrently herewith, which is incorporated herein by reference for all purposes.

FIELD

The present invention relates generally to storage systems and specifically to systems and methods of performance tuning of storage systems.

BACKGROUND

Backup solution providers often face the challenge of providing the most optimal backup performance to users. Some of the challenges may come from operational dependencies on many factors in backup environments. Such factors may include Operating System (OS) parameters (CPU, Memory, I/O queue etc.), backup software attributes (sessions, parallelism, multiplexing etc.), and hardware configurations (storage, NIC, SAN etc.), among others. Due to the constant changes of these factors, even if a provisioning was first conducted to optimize a backup system performance, the optimized performance may not be sustained if the initial settings are not adapted to the changing environment. Thus, constant changes in any backup environment would require constant calibration of the backup software and/or hardware to optimize the backup system performance.

Manual configuration of a backup environment is both error-prone and inefficient. For example, when facing a complex backup environment, it is easy to miss out dependencies on one or many parameters during a manual configuration. Further, when most of the examinations and configurations of system parameters are conducted manually, it would place a significant maintenance overhead on administrators to keep up with the constant changes in backup environments.

There is a need, therefore, for an improved method or system that would automatically adapt to changes in a backup environment to optimize the backup performance.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
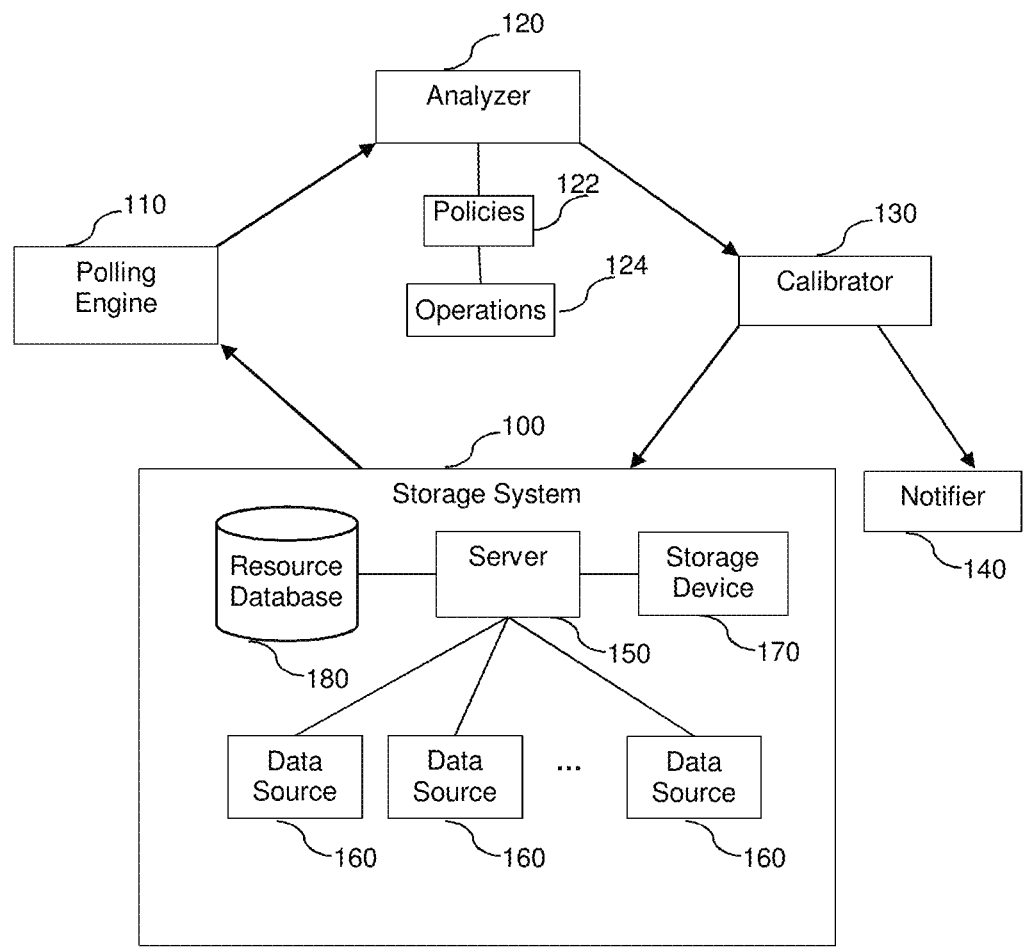
FIG. 1 is a diagram of a storage system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Disclosed herein are methods and systems that would adapt to changes in a storage system for optimizing system performance. As storage systems continue to expand into new application areas, the workloads produced by backup and recovery operations also increases. Optimizing storage system performance during backup and/or recovery to cope with such increasing demands is difficult, because system workload fluctuates constantly. Due to the fluctuation, system resources may be underutilized or over utilized over time if the system continuous to use the initial provisioning configuration. Accordingly, for a system to maintain the optimized performance, it may be desirable to have an adaptive method and system to calibrate automatically according to the system workload fluctuation.

Several approaches may be used to adjust the configuration of a storage system in order to increase or decrease the system workload. For example, Networker by EMC Corporation stores system configuration and active session attributes in a resource database associated with each server. During a backup and/or recovery operation, system resources such as CPU and memory may be allocated to handle the workload. The system resources utilization depends on many factors, such as the number of backup and/or recovery operations, the type and speed of an operation, and the device input/output rate, among others. When the system resources are over utilized or underutilized, the system performance may not be optimized. To restore the optimized system performance, system configuration and active session attributes in the resource database of Networker may be modified to decrease or increase the workload produced by backup and/or recovery operations.

For example, when system resource over utilization is observed, a user may manually inspect the system to determine which processes are producing excessive workload that consumes too much system resources. The user may then identify possible performance tuning solutions, such as reducing the number of active sessions of backup and/or recovery operations. The user may then update the resource database of Networker to decrease the number of active sessions. By reducing the number of active sessions, resources consumed by backup and/or recovery operations may be decreased to the optimized level; and the workload produced by backup and/or recovery operations may be reduced to restore the optimized system performance.

When such performance tuning is conducted manually, it is both laborious and error prone. In some embodiments of the present invention, an automated process may be used to monitor and analyze system performance and calibrate the system accordingly to increase the efficiency and accuracy of system performance tuning.

FIG. 1 is a system architecture illustrating one embodiment of a data storage system. Storage System 100 includes Server 150, Data Sources 160, Storage Device 170 and Resource Database 180. Data Source 160 may be a backup client, such as a laptop, desktop, or a virtual machine. As illustrated by FIG. 1, there may be any number of clients. Server 150 may store backup data on Storage Device 170 and transfer backup data to Data Sources 160 when necessary.

In some embodiments, Polling Engine 110, Analyzer 120, Calibrator 130 and Notifier 140 may be used for adaptive performance tuning of Storage System 100. At a time instance, Polling Engine 110 may poll Storage System 100 for attributes associated with the workload of Storage System 100. Analyzer 120 may apply Policies 122 to the values obtained by Polling Engine 110 and determine whether Storage System 100 performance is optimized. Once a determination is made that Storage System 100 workload is not at an optimized level, Analyzer 120 further determines what modifications need to be made based on Operations 122 associated with Policies 122. Calibrator 130 may then perform the modifications. The time instance, the attributes polled, the values obtained, and the modifications may be recorded by Notifier 140 as logs and/or into reports to send to users.

Polling Engine 110, Analyzer 120, Calibrator 130 and Notifier 140 may be modules that are capable of executing the processes and methods described herein. Though FIG. 1 illustrates Polling Engine 110, Analyzer 120, Calibrator 130 and Notifier 140 to be external to Storage System 100, Polling Engine 110, Analyzer 120, Calibrator 130 and Notifier 140 may reside and operate or be operated inside Storage System 100. As used herein, "module" may refer to logic embodied in hardware or firmware, or to a collection of instructions such as software instructions, possibly having entry and exit points, written in instructions or a programming language. The modules described herein may also be represented in hardware or firmware.

In some embodiments, Data Sources 160 may be in communication with Server 110 using a dedicated communication link, one or more networks, a local area network, a wide area network, a storage area network, the Internet, a wired network, and/or wireless network, among others. Similarly, other communication links connecting Data Sources 160, Server 150, and Storage Device 170 may be a dedicated communication link, one or more networks, a local area network, a wide area network, a storage area network, the Internet, a wired network, and/or wireless network, among others.

Storage Device 170 may represent a non-transitory storage system facilitating storage and retrieval of a collection of data by other systems. Though FIG. 1 illustrates one Server 150 and one Storage Device 170, Storage System 100 may include a plurality of Servers 150 storing backup data on a plurality of Storage Devices 170 and transferring backup data to a plurality of Data Sources 160 when necessary. Further, Server 150 may be connected to multiple storage devices through different connectors and over various types of connections.

One Storage Device 170 in turn may include one or more disks, each containing a different portion of data stored on Storage Device 170. The storage space in Storage Device 170 may also be apportioned pursuant to a file system, or may be logical or virtual (i.e. not corresponding to underlying physical storage) or may be subdivided into a plurality of volumes or logical devices. The logical devices may or may not correspond to the physical storage space of the disks. Thus, for example, a physical storage device may contain a plurality of logical devices or, alternatively, a single logical device could span across multiple physical devices. Server 150 may be configured to access any combination of logical devices independent of the actual correspondence between the logical devices and the physical devices. Storage Device 170 may be provided as a stand-alone device coupled relatively directly to Server 150 or, alternatively, Storage Device 170 may be part of a storage area network (SAN) that includes a plurality of other storage devices as well as routers, network connections, etc. The system described herein may be implemented using software, hardware, and/or a combination of software and hardware where software may be stored in an appropriate storage medium and executed by one or more processors.

Different Data Sources 160 may have different backup and/or recovery needs. In response to the backup and/or recovery needs, Server 150 may conduct multiple backup and/or recovery operations in parallel at a given time. When the workload produced by backup and/or recovery operations increases or decreases, Storage System 100 resources, such as CPU, memory among others, may be over utilized or underutilized. In particular, the number of active sessions running concurrently by a backup application may over utilize or underutilize Storage System 100 resources.

For example, one Server 150 may be connected to multiple storage devices to store backup data from a plurality of Data Sources 160. At a time instance, between Server 150 and one Data Source 160, multiple processes, such as active sessions or save streams, may be running in parallel to send data to Server 150. Similarly, between one Server 150 and one Storage Device 170, multiple processes, such as active sessions or save streams, may be open to write data to Storage Device 170. Concurrently, multiple backup and/or recovery operations may be performed on a plurality of Data Sources 160 by Server 150, with each backup and/or recovery operations running multiple processes, such as active sessions or save streams. These backup and/or recovery operations produce workloads on Storage Device 170. The workloads may be handled by allocating resources of Storage System 100, such as CPU time, memory, and I/O bandwidth. As the amount of backup and/or recovery operations fluctuates, Storage System 100 workloads may be above or below an optimized level, and the system resources may be over utilized or underutilized. In some embodiments, monitoring and analyzing the number of active backup and/or recovery processes along with other attributes and calibrating accordingly may adapt Storage System 100 to constant changes in order to optimize Storage System 100 performance.

Still referring to FIG. 1, in some embodiments, Server 150 may be associated with Resource Database 180 to store information of configuration and consumption of resources at a given time instance within Storage System 100. Such information may be related to devices, schedules, clients, groups and policies, among others. Through value changes in Resource Database 180, Storage System 100 may be reconfigured and the workload within Storage System 100 may be increased or decreased. An example of a storage system, which utilizes Resource Database 180 to facilitate system configuration, is Networker, a product available from EMC Corporation. Though FIG. 1 illustrates Resource Database 180 to be internal to Storage System 100, Resource Database 180 may reside and operate or to be operated outside Storage System 100.

Figure 2:
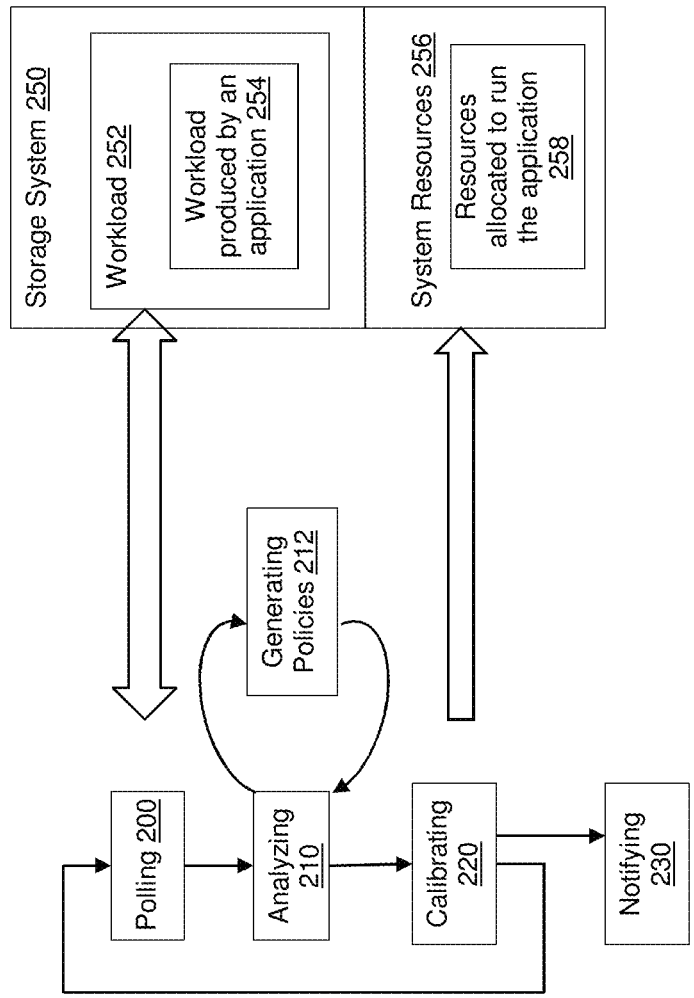
FIG. 2 is a schematic diagram of a storage system with polling, analyzing, calibrating, and notifying modules in accordance with some embodiments.
Figure 2:
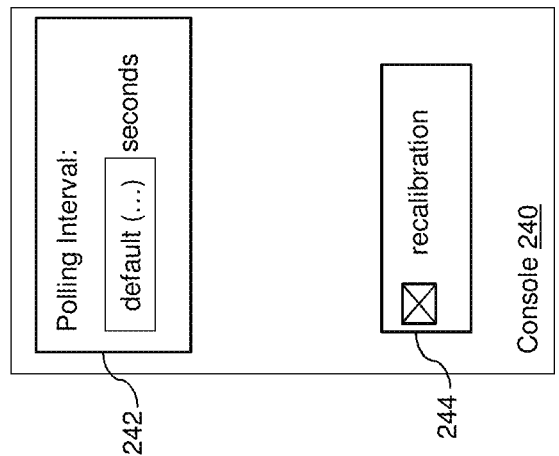

FIG. 2 is a schematic diagram of a storage system with polling, analyzing, calibrating, and notifying modules in accordance with some embodiments. Polling Engine 110 may poll Storage System 250 periodically at a time interval to request Workload 252. The polling interval 242 may be by default or entered by a user as part of a user interface through Console 240. In response to a polling request in step 200 Polling, Storage System 250 may return values corresponding to attributes associated with Workload 252. Based on the data returned from Storage System 250, Analyzer 120 may perform step 210 Analyzing to search a plurality of policies to determine if Workload 252 of Storage System 250 is at an optimized level. Once Analyzer 120 determines Storage System 250 performance is not optimized by matching some policies with the data obtained from step 200 Polling, in step 210 Analyzing, Analyzer 120 may further search operations associated with the matching policies. These operations become recommendations to Calibrator 130 to make changes to the values of some attributes.

In step 220 Calibrating, based on Analyzer 120 recommendations, Calibrator 130 may make changes to Storage System 250 attributes to increase or decrease the amount of backup and/or recovery operations within Storage System. Any modifications along with other information may be recorded as logs and/or reports in step 230 Notifying. Console 240 may also provide an option of recalibration 244. When chosen, another round of Polling 200, Analyzing 210, and Calibrating 220 may be performed immediately after running the calibrator. When recalibration option 244 is not chosen, steps Polling 200, Analyzing 210, and Calibrating 220 may be conducted after a Polling Interval 242.

A policy may refer to an entity on which modifications may be based. A policy may specify goals, metrics and/or priorities, among other parameters. For example, a policy may be presented as one or more conditions and/or constraints that need to be satisfied. In some embodiments, a policy may specify a description, including, but not limited to a status, and a simple condition and/or constraint, and expressed as the following form: attributes, minimum, and maximum, among others. When the values of the attributes are within the range of minimum and maximum, the condition may be considered satisfied. Simple conditions and/or constraints may be used as building blocks for complex policies. Complex policies may include combinations of disjunctive simple conditions and/or constraints, conjunctive simple conditions and/or constraints, and/or negations of individual simple conditions constraints.

In some embodiments, Storage System 250 may contain multiple concurrently running applications. A backup and/or recovery application may be one of them. Each application in turn may run a plurality of processes concurrently. The multiple concurrent processes produce Workload 252. Among workloads produced by multiple applications, Workload produced by an application 254 such as a backup and/or recovery application may use a portion of System Resources 256. In FIG. 2, the portion of Resources allocated to run the application is denoted as 258. An optimized percentage of resources allocated to run the application may be obtained from user inputs or derived from user requirements. Based on the optimized percentage and the available System Resources 256 amount, the optimized amount of Resources allocated to run the application 258 may be determined. Further, based on the amount of Resources allocated to run the application 258 and knowledge of the amount of resources needed for running each process of the application, analyzer may calculate the optimized number of concurrent processes by the application and use the value in step 212 Generating Policies. Each of the policies automatically generated in step 212 Generating Policies may be a function of a set of attributes. The set of attributes may include the amount of System Resources 256, a percentage allocation to Resources allocated to run the application 258, and the amount of resources allocated to run each process, among others.

Step 212 Generating Policies has the benefit of adaptive to any changes in a storage system. For example, in some embodiments, using default policies may be sufficient to tune a storage system for optimizing performance. However, new applications may be installed on a storage system. As a result, the resource allocation to a backup and/or recovery application may change to accommodate the addition. Consequently, to maintain the optimized storage system performance, attributes such as the number of concurrent processes running by the backup and/or recovery application, among others may be affected. In accordance with some embodiments, having policies as a function of resources information, the percentage allocation of resources to the backup and/or recovery application, and the amounts of the resources allocated to the process enables the present invention to adaptive to not only workload changes caused by the backup and/or recovery application, but also workload changed caused by other applications in the entire storage system.

Figures 3A, 3B:
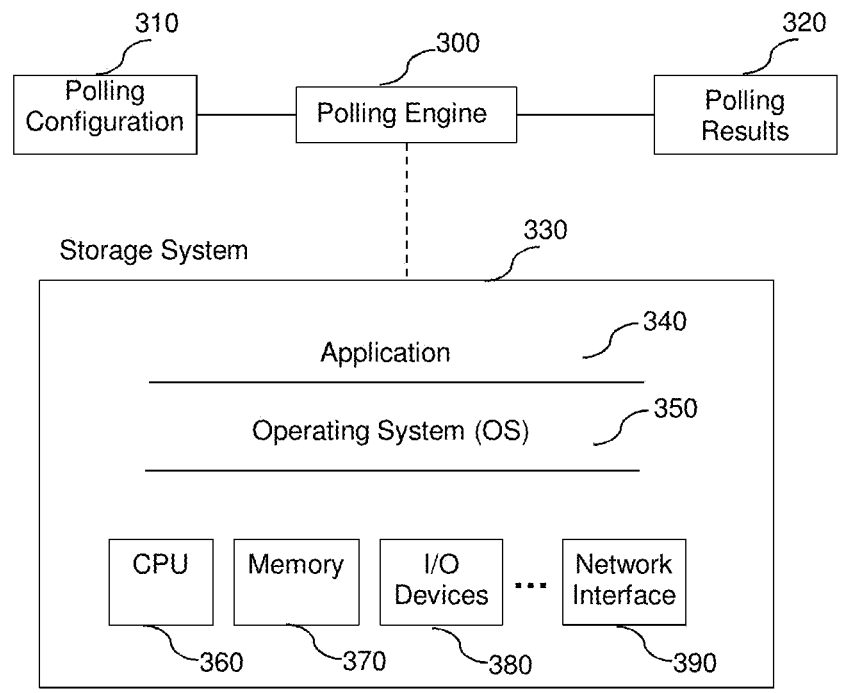
FIG. 3A is a diagram of a polling engine in accordance with some embodiments.
FIG. 3B is a table illustrating example polling results in accordance with some embodiments.

FIG. 3A depicts an exemplary architecture of a polling engine, in accordance with some embodiments. Polling Engine 300 may be associated with Polling Configuration 310 and Polling Results 320. Though FIG. 3A depicts Polling Configuration 310 and Polling Results 320 as external to Polling Engine 300, Polling Configuration 310 and Polling Results 320 may be internal or external to Polling Engine 300.

Polling Configuration 310 may include information, such as polling intervals among other configurations of Polling Engine 300, and/or the attributes that need to be obtained by Polling Engine 300. The configuration values may be user specified or by default as illustrated in FIG. 2. Over network connections and/or direct connections, at a time instance Polling Engine 300 may poll Storage System 330 for attributes associated with Storage System 330 workload. Polling Results 320 containing corresponding values may be returned over network connections and/or direction connections and stored.

Within Storage System 330, each device may include Operating System (OS) 350 that manages system resources and provide common services for running application programs, such as Application 340. An operating system may performs basics tasks such as controlling and allocating memory, prioritizing system requests, controlling input and output devices, facilitating computer networking, and managing files. In some embodiments, system resources may include central processing unit (CPU) 360, Memory 370, I/O Devices 380, and Network Interface 390, among others. Time-sharing Operating Systems 350 may schedule tasks for efficient use of the system and may also include accounting for cost allocation of resources. The accounting for cost allocation of resources to different applications may be conducted through system commands or API's. The accounting result may also be used to identify the amount of resources allocated to different of applications running on top of OS and calibrate the applications accordingly.

For example, as illustrated in FIG. 3A, Application 340 may be installed within Storage System 340. In some embodiments, Application 340 may be a backup application to perform backup and/or recovery operations. To run Application 340, Operating System 350 may provide common services and allocate system resources, such as a portion of CPU process time, memory, I/O bandwidth to perform backup and/or recovery operations. The backup and/or recovery operations may be conducted through running concurrent processes. Each process may be associated with a process identifier and/or process name. In some embodiments, certain processes running by Application 340 may have certain patterns of process identifiers and/or process names. Through accounting by OS, the amount of resources allocated to Application 340 may be identified when Polling Engine 300 inquires about Storage System 340 workload. The identification may be conducted through searching and identifying process identifiers and/or process names associated with processes running by Application 340. Once the amount of resources allocated to Application 340 is identified, the value may be returned to Polling Engine 300 and stored for further analysis by analyzer.

FIG. 3B illustrates an exemplary Polling Engine 300 output, in accordance with some embodiments. As shown in FIG. 3B, two polls may be conducted at Time 392 instance t1 and t2. Attributes 394 and corresponding Values 396 may be collected during each poll. The polling interval from t1 to t2 may be configurable and stored in Polling Configuration 310. In the exemplary output shown in FIG. 3B, at t1, attributes such as Server CPU utilization, Client CPU utilization, and Throughput, among others may be examined. Value 65% for Server CPU utilization, 75% for Client CPU utilization, and 80 for Throughput may be returned to Polling Engine 300 and stored as Polling Results 320. Similarly, at t2, attribute Server CPU utilization along with others may be examined. And the value of 90% Server CPU utilization ratio may be returned to Polling Engine 300 and stored as Polling Results 320 for further analysis by analyzer.

In some embodiments, depending on Polling Configuration 310, the values obtained by Polling Engine 300 may be from different sources within Storage System 330. For example, in some embodiments, each attribute may be associated with a type in addition to a name. The type may indicate whether the attribute is operating system related attribute, such as CPU utilization, memory utilization, or I/O throughput, among others. The values of operating system related attributes may be obtained by system commands or API's through the accounting of cost allocation process described previously. The type may also indicate that the attribute is related to an application configuration. In a backup system, which utilizes Resource Database 180 to facilitate backup system configuration, the backup application configuration and corresponding values may be stored in Resource Database 180. By querying Resource Database 180, system performance data such as the number of concurrent processes from client to server, and/or from server to storage device, among others, may be obtained. The values may be returned to Polling Engine 300 and stored as Polling Results 320.

Figure 4:
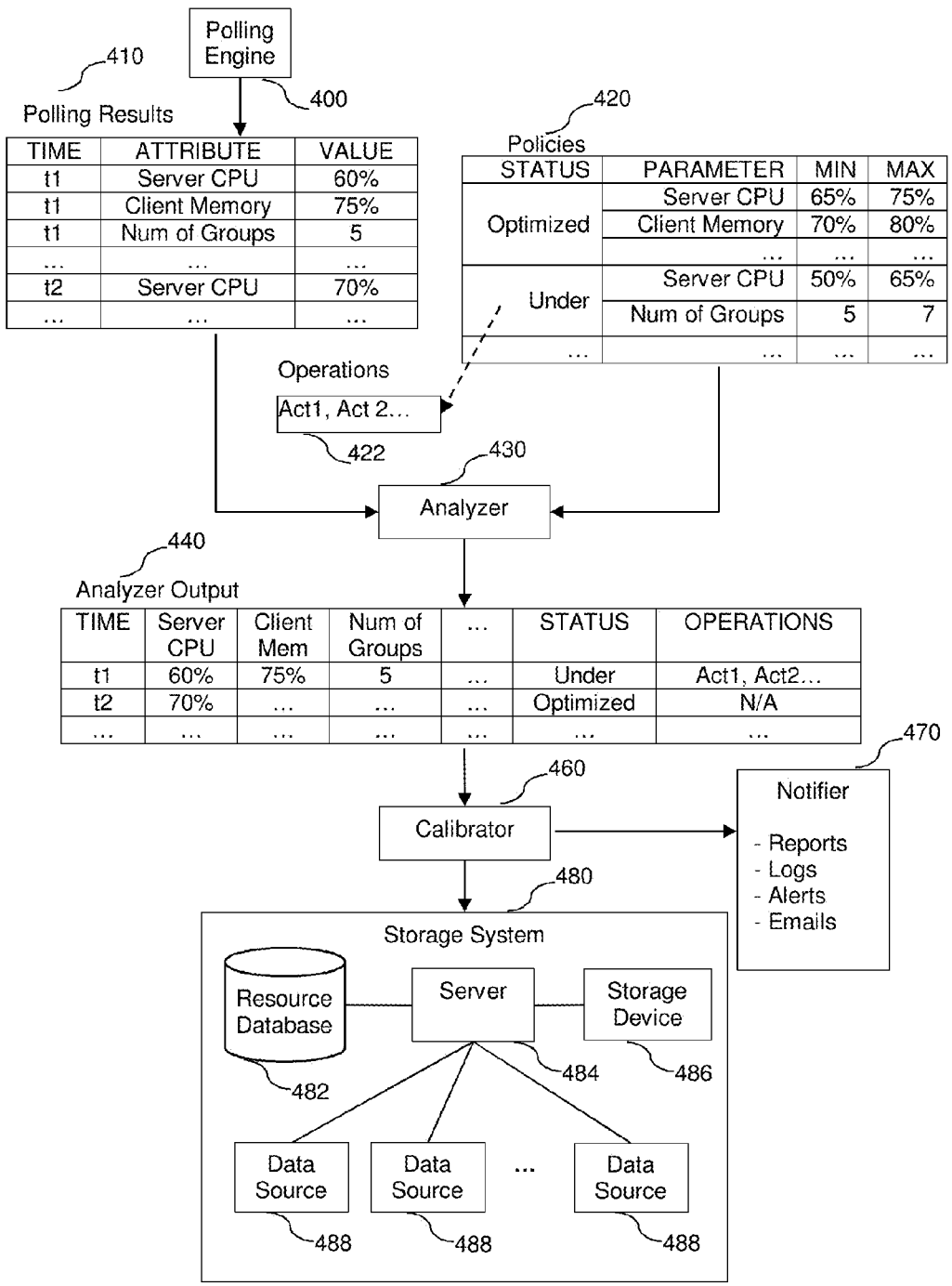
FIG. 4 is a diagram of the interaction among polling engine, analyzer, calibrator, and notifier in accordance with some embodiments.

FIG. 4 is a diagram of the interaction among polling engine, analyzer, calibrator, and notifier, in accordance with some embodiments. Analyzer 430 may be associated with one or more Policies 420. Before analyzing Polling Results 410, Analyzer 430 may obtain Policies 420 from a repository. In some embodiments, Analyzer 430 may generate Policies based on Polling Results 410, as illustrated in FIG. 2. After obtaining Policies 420, Analyzer 430 may search through Policies 420 and find a set of policies that contains conditions to be satisfied by Polling Results 410. The findings may be stored as Analyzer Output 440 for use by Calibrator 460 and Notifier 470. The output also includes findings of Operations 422 associated with Policies 420. Notifier 470 may store the time instance, the attributes polled by Polling Engine 400, the values obtained by Polling Engine 400, the output from Analyzer 430 analysis, and/or Operations 422, among others. The stored information may be used to generate logs and/or reports, and send to users in emails and/or alerts.

For example, as illustrated in FIG. 4, one example policy in Policies 420 may specify that Storage System 480 workload is considered at an optimized level when Server CPU utilization is within MIN of 65% and Max of 75%, and Client Memory utilization is within MIN of 70% and MAX of 80%, among other conditions. Another example policy as illustrated in FIG. 4 may specify that when Server CPU is within MIN of 50% and MAX of 65% and Number of Groups within Storage System 480 is within MIN of 5 and MAX of 7, workload of Storage System 480 is considered below an optimized level and system resources may be considered underutilized.

As shown in Analyzer Output 440, at a time instance t1, Polling Engine 400 may obtain values of 60% for Server CPU utilization, 75% for Client Memory utilization, and 5 for Number of Groups. Searching Policies 420, Analyzer 430 may find that the conditions in the second exemplary policy are satisfied. Thus, Analyzer 430 may indicate the status at t1 as underutilization of system resources, and Operations 422 associated with the second policy may also be found and stored in Analyzer Output 440. Based on Analyzer Output 440, appropriate actions Act 1, Act 2 may be taken to restore the optimized Storage System 480 performance. In the second example output illustrated in Analyzer Output 440, at time instance t2, Analyzer 430 may search Policies 420 and find that system resource utilization is at an optimized level and no action is required. Thus, through polling, analyzing, and calibrating, Storage System 480 may adapt to changes and maintain the optimized system performance efficiently.

Though FIG. 4 illustrates Policies 420 and Analyzer Output 440 as external to Analyzer 430, in some embodiments, Policies 420 and Analyzer Output 440 may be internal or external to Analyzer 430. In other embodiments, Analyzer Policies 420 and Analyzer Output 440 may be stored in one or more data stores. In addition, Analyzer 430 may also be associated with one or more data stores for storing configurations for Analyzer 430. The configurations for Analyzer 430 may include the intervals of analyzing Storage System 480, among others.

In some embodiments, a current point in time report may be generated by Notifier 470 that reflects the current configuration and status of a storage system. The report may include information such as the current point in time, current configurations of the storage system including the attributes and the corresponding values, and the optimized system performance level may be achieved, among others. The optimized system performance data may include the optimized number of clients to be backup up simultaneously, and/or the optimized throughput that may be achieved, among others. A best practice document may also be generated dynamically by Notifier 470 to let users know the critical attributes of a system, their current values and their recommended optimized values.

Using various reports generated by Notifier 470 in accordance with some embodiments has the benefit of efficient and effective adaptive provisioning. Each production storage system may be different. During polling, data related to available resources in Storage System 100 may be gathered. Based on the total available resources, known resource consumption by a backup application and the optimized resource allocation to the backup application according to user requirements, system attributes such as the number of concurrent backup and/or recovery processes may be calculated. In some embodiments, the calculation result may also be used to generate policies as illustrated in FIG. 2 step 212. The policies generated and the attributes values calculated are specific to the storage system for optimizing performance. Thus, the present invention also enables a provisioning process more efficient and more adaptive to a storage system.

Figure 5:
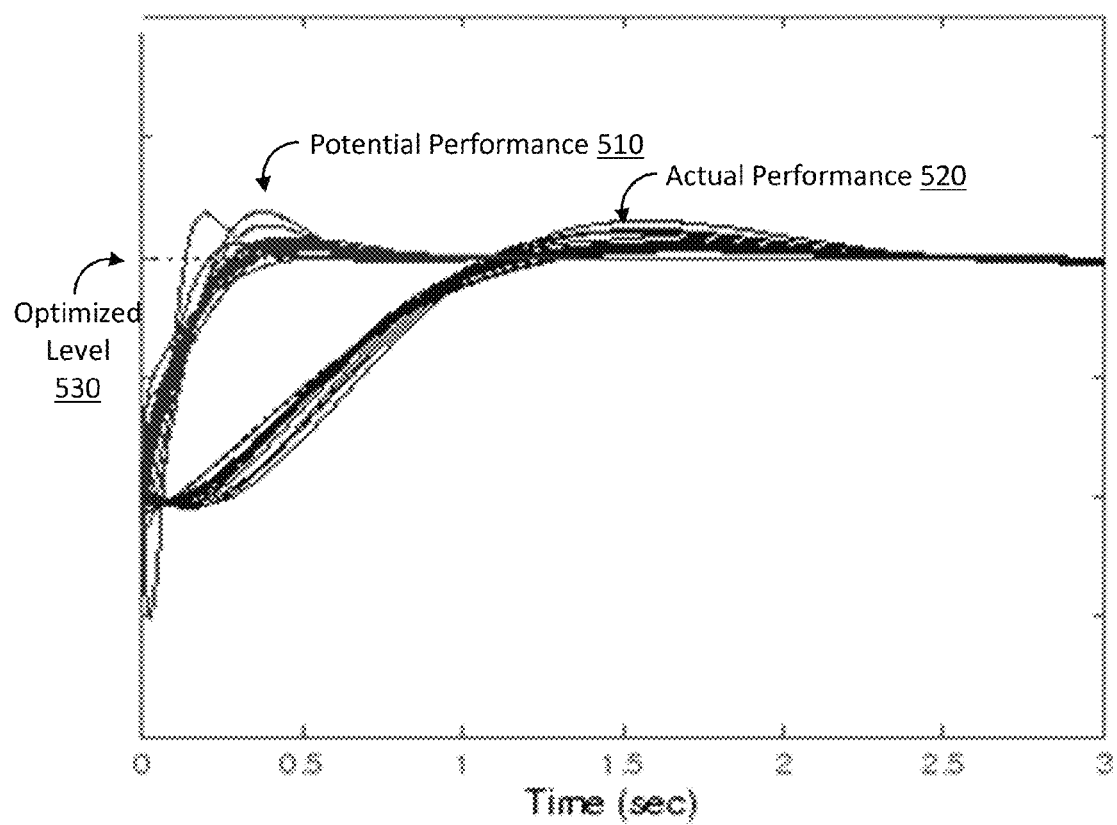
FIG. 5 is a diagram illustrating an example report generated by notifier in accordance with some embodiments.

Another type of report generated by Notifier 470 may be a trend report, as illustrated in FIG. 5. Actual Performance 520 may be generated without the involvement of automated performance tuning of the present invention. Potential Performance 510 may be generated with automated performance tuning enabled. Comparing Potential Performance 510 and Actual Performance 520, Potential Performance 510 with automated performance tuning reaches Optimized Level 530 faster than Actual performance 520. The improved efficiency is due to the polling of performance data by a polling engine, data analyzing and recommendation calculation by an analyzer, and automated calibration based on analyzer recommendation by a calibrator. Thus, automated performance tuning in accordance with some embodiments of the present invention is more efficient to reach and maintain system optimized performance.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method comprising:
    polling attributes associated with a workload of a storage system having different data sources with different data storage needs, to obtain corresponding values at a time instance, wherein each of the attributes is associated with a type and a name, wherein the storage system includes an application configured to run a plurality of processes concurrently in an operating system producing a portion of the workload, wherein each of the plurality of processes is associated with a process identifier;
    analyzing the values and the attributes to determine a need for modifying a set of the values corresponding to a set of the attributes when the workload is not at an optimized level with respect to a number of active sessions running concurrently by the application utilizing system resources to satisfy the different storage needs;
    determining an optimum percentage of system resources allocated to run the application; and
    modifying the set of the values to adapt the workload to optimize utilization of the system resources to minimize an under or over utilization condition based on the optimum percentage.

2. The method as recited in claim 1, wherein the optimum percentage of system resources allocated to run the application is obtained from one of received user inputs or derived user requirements, the method further comprising:
    obtaining a configuration for the modifying;
    determining a need for immediate recalibration based on the configuration;
    performing the polling, the analyzing, the modifying, and the storing processing immediately after the storing based on the need for immediate recalibration; and
    performing the polling, the analyzing, the modifying, and the storing processing at a time interval.

3. The method as recited in claim 1, further comprising
    storing the time instance, the attributes, the values, and the modification; and
    reporting the stored time instance, the attributes, the values, and the modification.

4. The method as recited in claim 1, wherein the storage system includes one or more servers, one or more data sources, and one or more storage devices, wherein each of the one or more servers is associated with a database, wherein the database contains a set of attributes and a set of corresponding values.

5. The method as recited in claim 4, wherein the polling comprises for each of the attributes:
   determining for an attribute whether the type is related to the operating system;
   if the type of attribute is related to the operating system, inspecting the storage system to obtain a value corresponding to the attribute; and
   if the type of attribute is not related to the operating system, querying the database for a corresponding value of the attribute, and obtaining the corresponding value.

6. The method as recited in claim 1, wherein the analyzing step facilitates dynamic tuning of the storage system by adapting to workload changes caused by the application and other applications in the storage system, and wherein analyzing the values and the attributes to determine the need for modifying the set of the values corresponding to the set of the attributes comprises:
   obtaining policies, wherein each of the policies is associated with an operation to a value within the set of the values, wherein each of the policies specifies a description including, but not limited to, a status, and a condition for performing the operation, wherein the condition specifies parameters including, but not limited to, minimum, maximum, and a subset of the attributes to be considered;
   searching the policies for operations to the set of the values;
   finding a set of the policies and locating one or more operations associated with the set of the policies, wherein the set of the policies contains conditions satisfied by the set of the values and the set of the attributes; and
   determining a need for modifying the set of the values based on the finding of the set of the policies.

7. The method as recited in claim 6, wherein the system resources comprise processor time, memory space, and input/output bandwidth, the active sessions comprise a plurality of backup and recovery operations to and from storage devices of the storage system, and further wherein the step of modifying the set of the values comprises reducing the number of active sessions of one or more backup or recovery operations.

8. The method as recited in claim 6, wherein optimized utilization of the system resources comprises one of optimizing a number of backup clients to backup simultaneously or optimizing throughput in the storage system, and wherein modifying the set of the values in response to the determination comprises for each of the set of the policies:
   determining if the status indicates the workload of the storage system is not at the optimized level;
   if the status indicates the workload of the storage system is below the optimized level, performing the operations by modifying the set of the values to increase the workload of the storage system; and
   if the status indicates the workload of the storage system is above the optimized level, performing the operations by modifying the set of the values to decrease the workload of the storage system.

9. The method as recited in claim 8, wherein the increasing the workload of the storage system includes increasing a number of the plurality of processes running concurrently to increase the portion of the workload.

10. The method as recited in claim 8, wherein the decreasing the workload of the storage system includes decreasing a number of the plurality of processes running concurrently to decrease the portion of the workload.

11. A storage system comprising:
   system resources provided by one or more servers, one or more data sources with different data storage needs, and one or more storage devices, wherein the one or more servers store data from the one or more data sources to the one or more storage devices as backups;
   a workload using the system resources;
   a polling engine for polling attributes associated with the workload of the storage system to obtain corresponding values at a time instance, wherein each of the attributes is associated with a type and a name, wherein the storage system includes an application configured to run a plurality of processes concurrently in an operating system producing a portion of the workload, wherein each of the plurality of processes is associated with a process identifier;
   an analyzer for analyzing the values and the attributes to determine a need for modifying a set of the values corresponding to a set of the attributes when the workload is not at an optimized level with respect to a number of active sessions running concurrently by the plurality of processes utilizing system resources to satisfy the different storage needs;
   a component determining an optimum percentage of system resources allocated to run the plurality of processes; and;
   a calibrator for modifying the set of the values in response to the determination to adapt the workload to optimize utilization of the system resources to minimize an under or over utilization condition based on the optimum percentage.

12. The method as recited in claim 11, wherein the storage system provides a user interface that provides an input to specify a polling interval for the polling engine to run.

13. The method as recited in claim 11, wherein the optimum percentage of system resources allocated to run the application is obtained from one of received user inputs or derived user requirements, and wherein the storage system provides a user interface that provides an option that, when chosen, causes an immediate recalibration after running the calibrator.

14. The method as recited in claim 11, the analyzer facilitates dynamic tuning of the storage system by adapting to workload changes caused by the application and other applications in the storage system, and wherein each of the one or more servers is associated with a database, wherein the database contains a set of attributes and a set of corresponding values.

15. A computer program product comprising a non-transitory computer usable medium having machine readable code embodied therein for:
   polling attributes associated with a workload of a storage system having different data sources with different data storage needs, to obtain corresponding values at a time instance, wherein each of the attributes is associated with a type and a name, wherein the storage system includes an application configured to run a plurality of processes concurrently in an operating system producing a portion of the workload, wherein each of the plurality of processes is associated with a process identifier;
   analyzing the values and the attributes to determine a need for modifying a set of the values corresponding to a set of the attributes when the workload is not at an optimized level with respect to a number of active sessions running concurrently by the application utilizing system resources to satisfy the different storage needs;
determining an optimum percentage of system resources allocated to run the application; and
modifying the set of the values to adapt the workload to optimize utilization of the system resources to minimize an under or over utilization condition based on the optimum percentage.

* * * * *